Jan. 1, 1946.  J. H. MANSFIELD  2,392,169
MACHINE TOOL
Filed Sept. 18, 1942   6 Sheets-Sheet 1
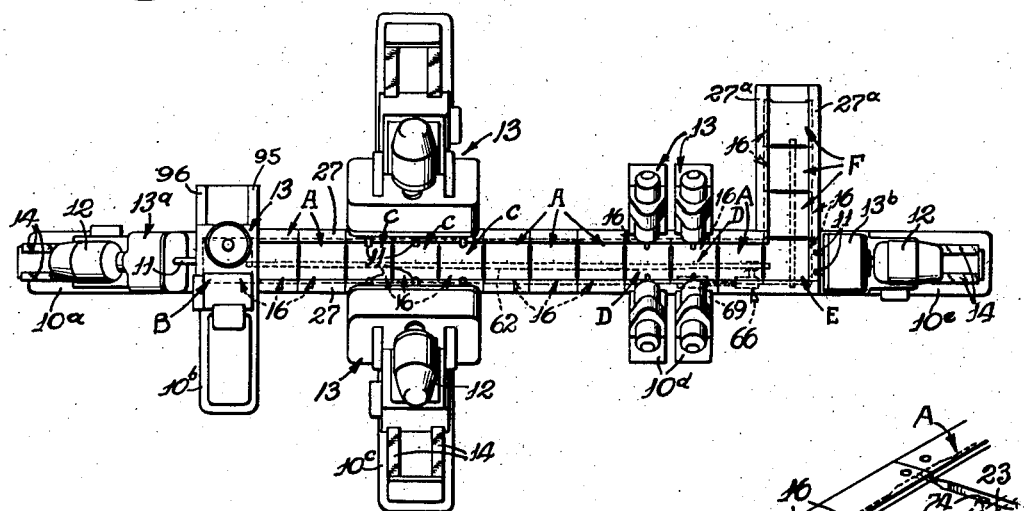
Fig.1
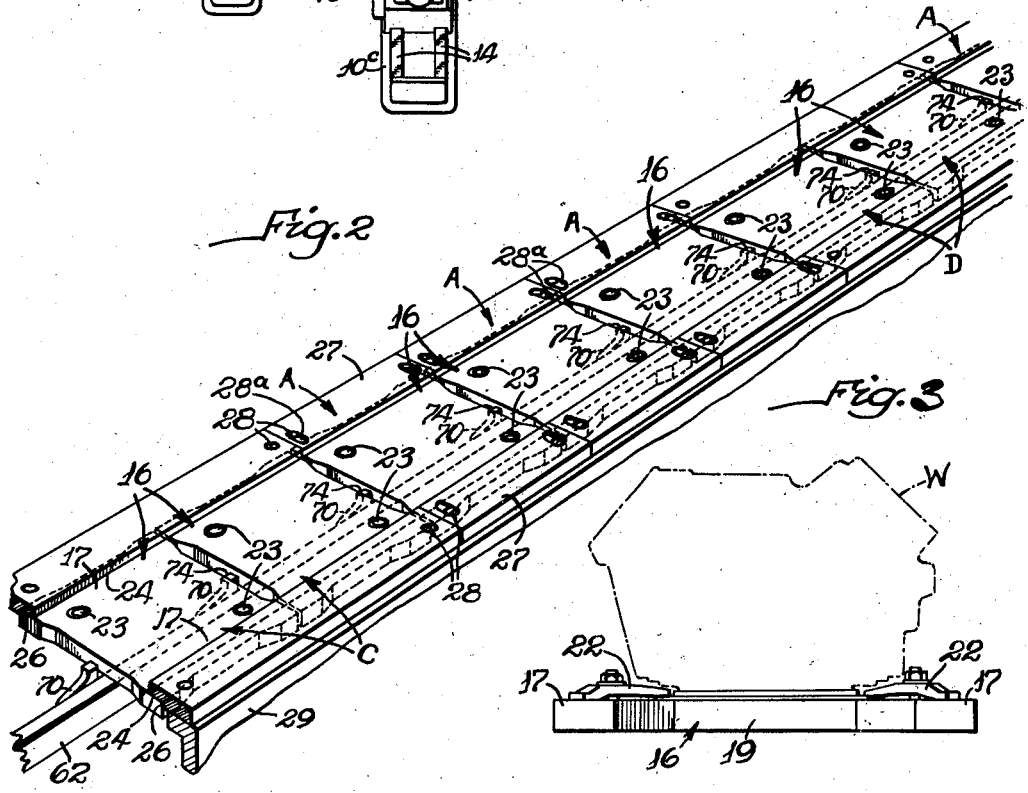
Fig.2
Fig.3
INVENTOR
Judson H. Mansfield
ATTORNEYS Jan. 1, 1946.　　J. H. MANSFIELD　　2,392,169
MACHINE TOOL
Filed Sept. 18, 1942　　6 Sheets-Sheet 4

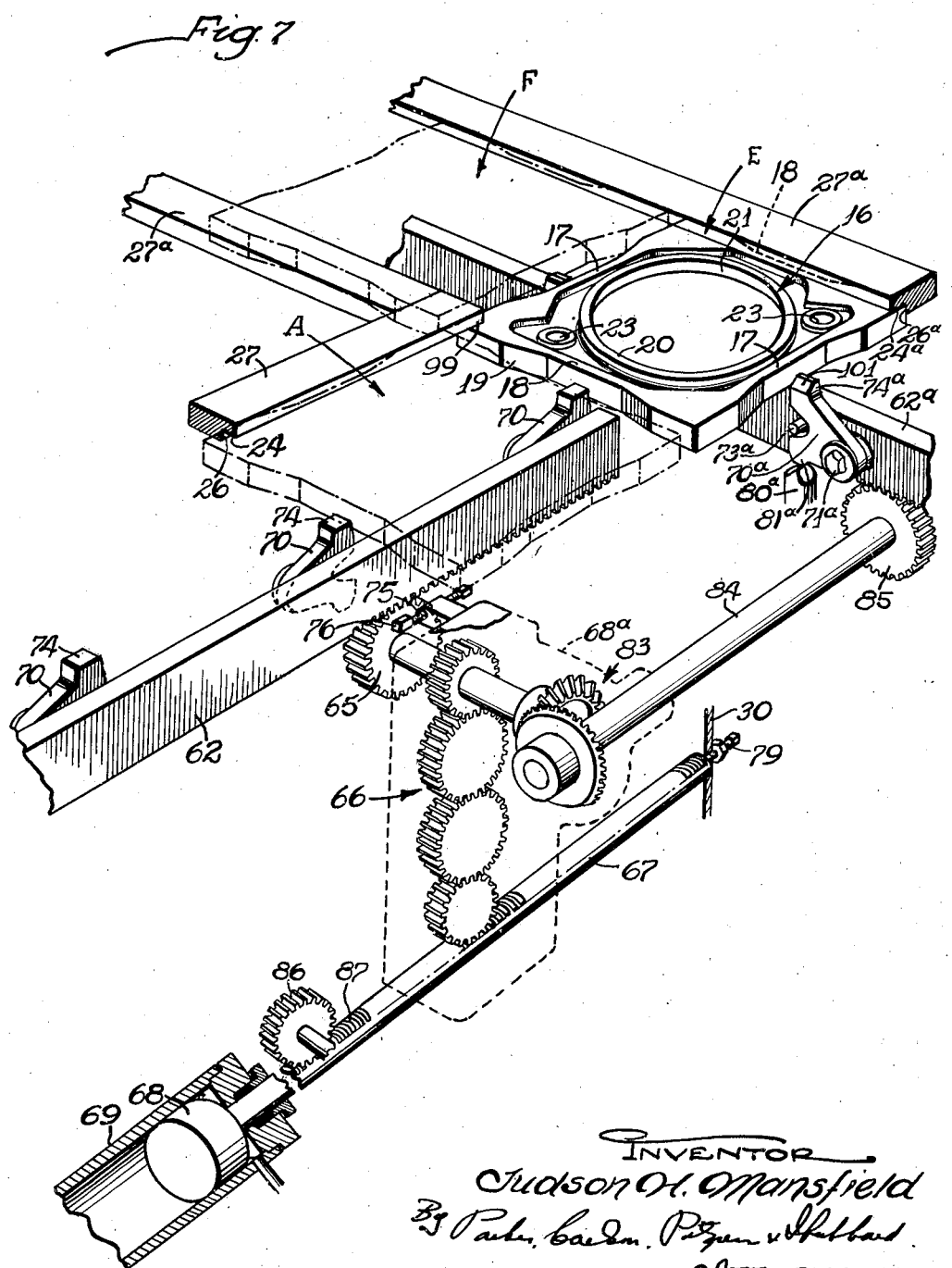

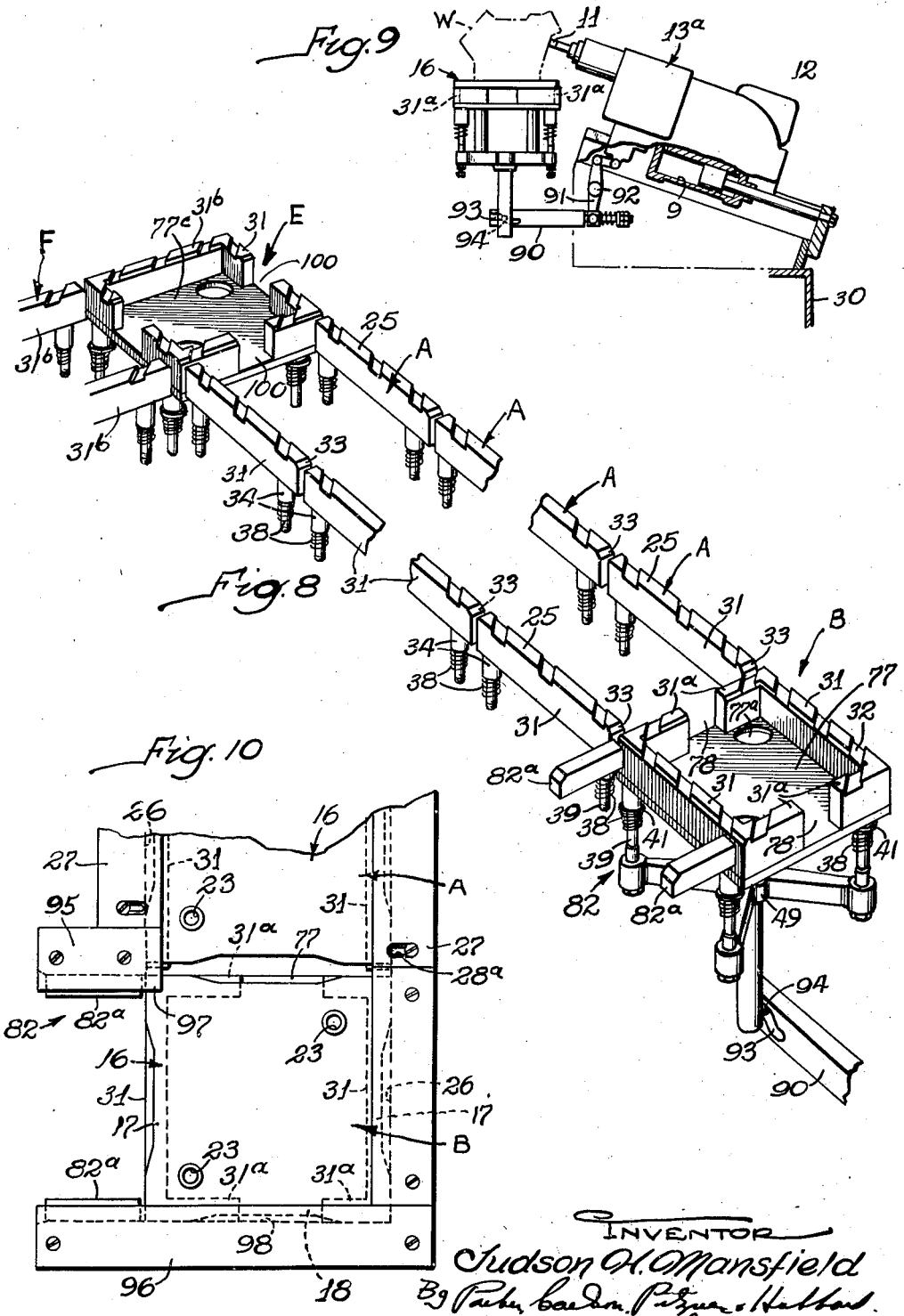

Patented Jan. 1, 1946

2,392,169

UNITED STATES PATENT OFFICE 2,392,169

MACHINE TOOL

Judson H. Mansfield, Rockford, Ill., assignor to Greenlee Bros. & Co., Rockford, Ill., a corporation of Illinois Application September 18, 1942, Serial No. 458,815

25 Claims. (Cl. 29—33)

This invention relates to machine tools of the type in which work pieces arranged in a row are advanced step-by-step through a line of stations in which the pieces are clamped and held fast in predetermined positions while being machined.

One object is to provide a machine tool of the above character having novel means for supporting the work pieces and guiding them during their transfer so as to simplify greatly the construction of the entire organization and also avoid the possibility of chips or like interfering with the proper location of the pieces.

A more detailed object is to provide for locating the work pieces against downwardly facing surfaces which are engaged continuously during the advance of the pieces along the line.

The invention also resides in the novel and simple construction of the work guiding and locating mechanism.

Another object is to dowel the work pieces in operating positions in a novel manner.

A further object is to provide a novel mechanism for actuating the clamping and dowel members to effect final and accurate location of the work pieces.

Still another object is to provide a machine tool of the above character in which each work piece is transferred first in one direction and then in another whereby to expose different sides of the work piece for machining.

Other objects and advantages of the invention will become apparent from the following detailed description taken in connection with the accompanying drawings, in which Figure 1 is a plan view of a machine tool organization embodying the novel features of the present invention.

Fig. 2 is a fragmentary perspective view of the portions of the work guiding and transfer mechanism.

Fig. 3 is an elevational view of a work piece.

Figure 4:
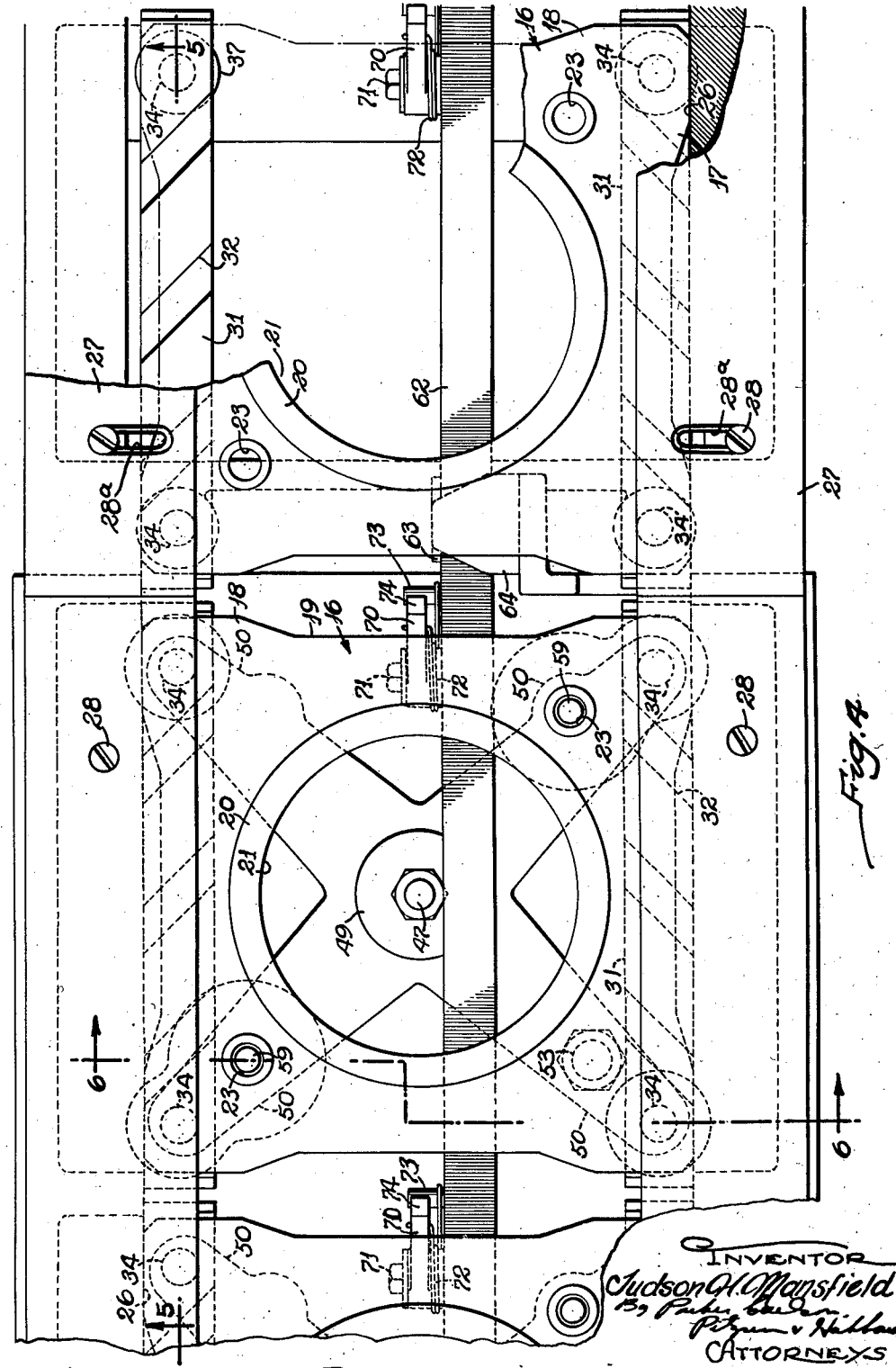
Fig. 4 is a fragmentary plan view of the work supporting and guiding mechanism.
Figure 5:
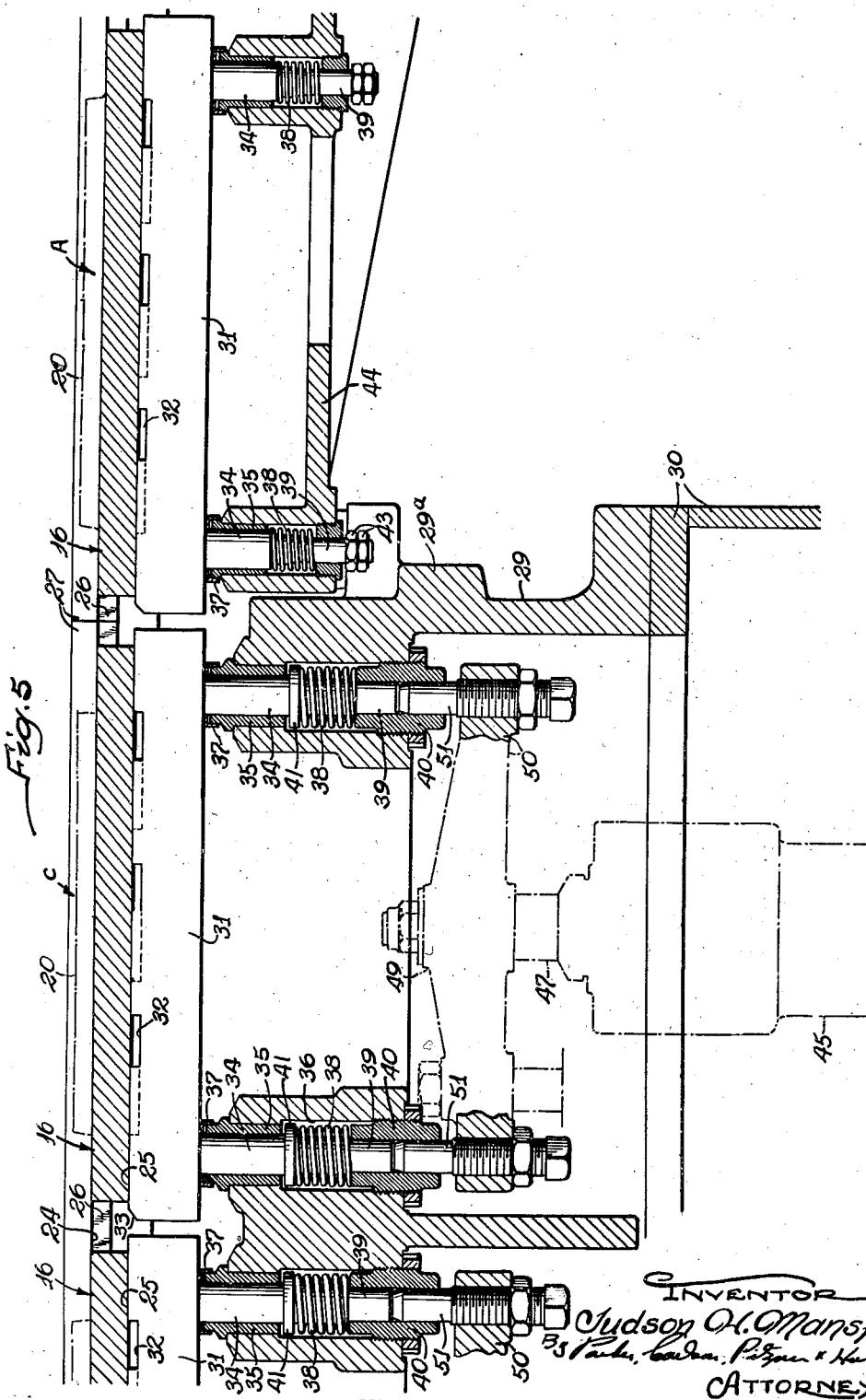
Figure 6:
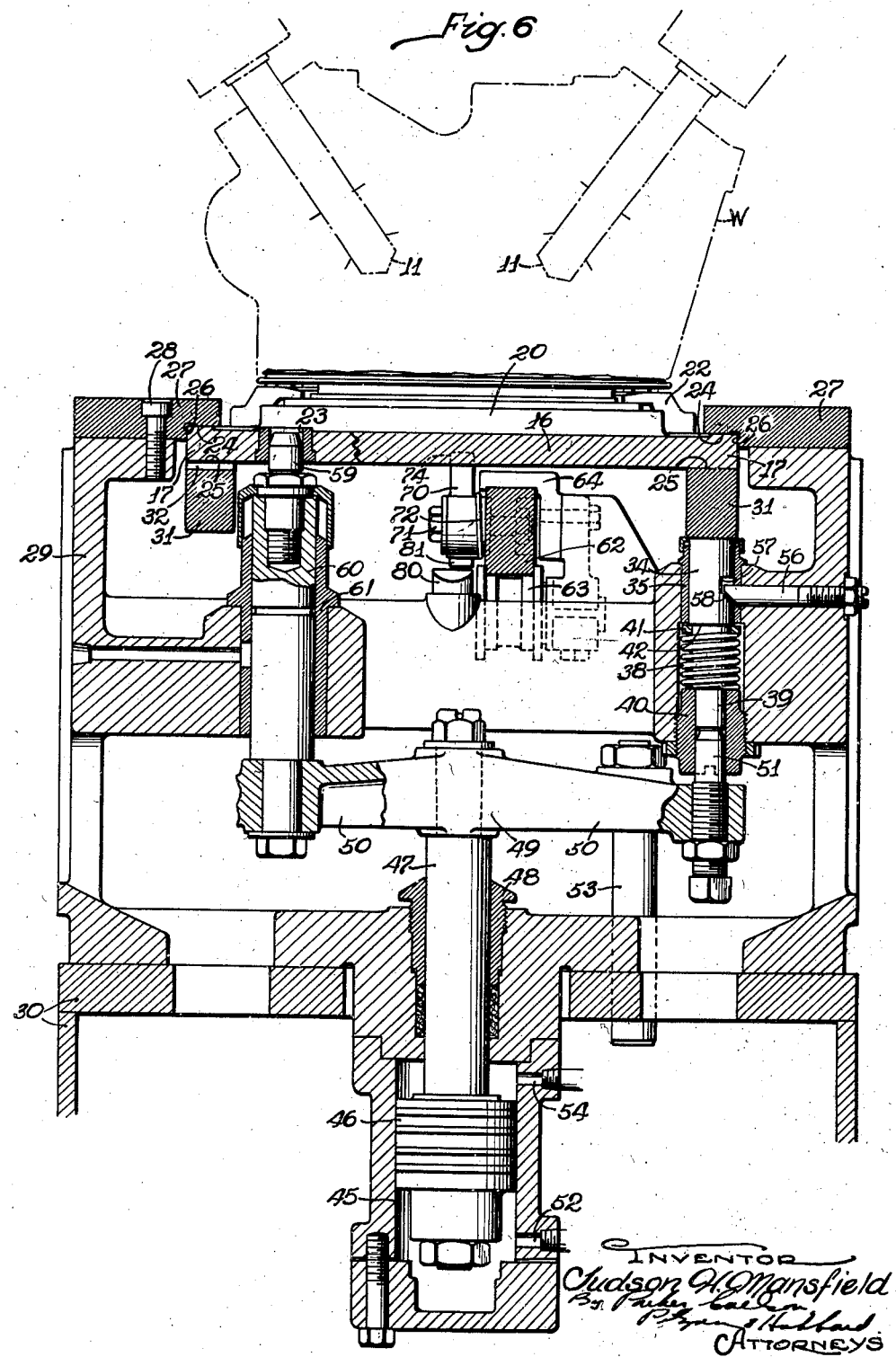

Figs. 5 and 6 are sections taken substantially along the lines 5—5 and 6—6 of Fig. 4.

Fig. 7 is a fragmentary perspective view of the transfer mechanism and its actuator.

Fig. 8 is a fragmentary perspective view of the work supporting parts at the different stations.

Fig. 9 is a fragmentary side elevational view of the tool head at one station.

Fig. 10 is a plan view of the work supports and guides at the loading station.

In the embodiment of the invention herein shown by way of illustration, work pieces W are advanced with a step-by-step motion through a series of stations arranged in juxtaposed relation and each of a length corresponding to the length of each stepping movement. The work pieces are advanced preferably in a straight line, and spaced along the path of travel are a plurality of individual tool units respectively designed to perform different operations upon work pieces in their travel through the machine.

As shown in Fig. 1, a plurality of tool units $10^a$, $10^b$, $10^c$, $10^d$ and $10^e$ are spaced along the path of travel of the work pieces, certain of the units encompassing one station, others two, and still others three. The stations intervening between the machine units are designated A and those occupied by the units are respectively designated B, C, D and E. The latter are therefore operating stations arranged to perform such operations as drilling, tapping, milling, boring, etc., whereas the intervening stations A are idle stations. It will be understood that the individual machine units 10 form per se no part of the present invention. As herein shown, they may be of the way type, comprising tools 11 driven by motors 12 on heads 13 which are advanced along suitable ways 14 toward and from either side or the top of the work pieces in a direction perpendicular to the path of travel of the work pieces through the machine. Herein, the tool heads $13^a$ and $13^b$ are advanced generally longitudinally of the main path of travel and therefore are adapted to operate on opposite ends of the work pieces in the terminal stations B and E. Suitable power actuators such, for example, as hydraulic pistons and cylinders 9 (Fig. 9) are provided for advancing and retracting the tool heads.

My invention concerns primarily a new and improved construction and arrangement for supporting and positioning work pieces in their travel through the machine, and it has special reference to the mounting of the work pieces upon individual carriers to facilitate transfer from station to station, in combination with power actuated clamping means at each operating station adapted to insure accurate positioning and holding of the work at such station. As will be recognized, work pieces are usually of irregular shape and frequently do not embody surfaces suitable for use in locating, positioning and clamping the work accurately with respect to various tool units disposed along the path of travel in an organization of the character herein contemplated. Accordingly, I provide individual work carriers providing marginal edge portions adapted for sliding support along parallel guideways, the latter including locating surfaces against which the marginal edge portions may be clamped. Each carrier is equipped with suitable clamping means, and previous to the clamping of the work pieces upon the plates, the work pieces are appropriately machined for purposes of uniformity.

It is of course contemplated that the individual work carriers will be especially designed with respect to the particular character of the work to be operated upon. In Figs. 1 and 2 the carriers are, for the sake of simplicity, shown as flat solid plates generally rectangular in form. However, for the purpose of supporting work pieces W (Figs. 3 and 6) consisting of irregularly shaped heads of internal combustion engines, the carrier plates are centrally apertured and shaped in the manner specifically shown in Figs. 4 and 7. As thus shown, the plates 16 are square with the central portions of their edges cut back as indicated at 19. The top and bottom surfaces of the margins 17 and 18 are machined accurately so that the margins are of uniform thickness. An annular rib 20 upstanding around a central opening 21 is adapted to fit in a bottom recess in the work piece. Preferably dowel pins (not shown) serve to locate the work piece accurately on its carrier plate 16. The piece is fastened to the plate by screw-actuated clamping members 22 overlying parts of the work piece. Near diagonally opposite corners, each plate is formed with bushed dowel holes 23 which bear a definite positional relation to the work piece when the latter is mounted on the carrier plate 16 as above described.

It will be observed that since the carrier plates and work pieces are rigidly secured together, the laterally projecting side and end portions of the plate may be said to constitute laterally projecting side and end flanges 17 and 18 which are utilized in supporting and guiding the pieces during transfer through the successive work stations. These flanges being at the bottom of the work piece, all four sides and the top of the latter are left exposed for the performance of machining operations thereon.

While the work pieces are disposed in or are being transferred between the idle and work stations, they are supported through the medium of their side flanges 17 by an elongated guideway extending from the initial or loading station B to the final work station E. In accordance with the invention, the guideway is constructed with spaced horizontal surfaces 24 (Figs. 2, 5 and 6) which overlie the top surfaces of the flanges 17, with surfaces 25 which underlie the flanges, and with vertical surfaces 26 (Fig. 6) that guide the plates laterally. One of the horizontal guide surfaces is stationary while the other is movable vertically and urged toward the stationary surface under spring effect so that the two horizontal surfaces bear continuously against the upper and lower surfaces of the work flanges 17 but permit the work pieces to be shifted along the guideway.

In the present instance, the horizontal and vertical guide surfaces 24 and 26 are stationary and are formed along the overhanging margins of rails or bars 27 extending throughout the line of machines and clamped by screws 28 against the top of box-like castings 29. The latter are provided at each work station and rest on bed structures 30. The horizontal surfaces 24 on the rails 27 face downwardly and serve to locate the work pieces accurately in a vertical direction while the pieces are being machined. The vertical surfaces 26 are spaced to receive the work plates loosely between them and thus serve as lateral guides.

The other horizontal guide surfaces face upwardly and are formed on rails 31, which, in this instance, underlie the flanges 17 and preferably have chip-receiving grooves 32 spaced along their upper edges and extending diagonally across the rails. Preferably, there is one pair of rails 31 at each station, including both idle and work stations, the rails in this instance being of a length slightly greater than the carrier plates 16. Thus, the rails at successive stations are arranged end to end and spaced apart only short distances (see Fig. 5). A bevel 33 is formed on the end of each rail first engaged by an advancing work plate thereby preventing possible interference.

Each rail 31 is yieldably supported at opposite ends and pressed into continuous contact with the undersides of the plates 16. To this end, plungers 34 rigid with the rail project downwardly through and are guided by shouldered bushings 35 which are secured in vertical bores 36 in the fixture casting 29. Inverted cups 37 on the plungers overlie the upper end of the bushings and exclude foreign matter from the guide surfaces.

A coiled compression spring 38 is disposed in the bore 36 below the bushing and encircles the lower end portion 39 of the plunger 34, which portion is guided in a bushing 40 threading into the lower end of the bore. At the work stations, the spring acts between the bushing 40 and a collar 41 bearing against a shoulder 42 (Fig. 6). At the idle stations A, the springs 38 act against a shoulder on the plungers 34 and the upward movement of the rails 31 is limited by stop nuts 43. At these stations, the plunger guide bushings are supported by a casting 44 which bridges the space between the work stations and rests on ledges 29ª of the castings 29 at the latter stations.

The four springs 38 which act on each pair of rails 31 and thus support the work plate 16 at its four corners are of sufficient strength to overcome the weight of a work piece so that the margins 17 of the carrier plates are pressed between the guide surfaces 24 and 25 at all times.

The upper fixed rails 27 are made in sections for a purpose which will presently appear, but are in effect continuous so that the possibility of any chips coming between the carrier plates and the downwardly facing locating surfaces is eliminated. Because there is a separate pair of rails 31 for each station, pressure will always be applied to each carrier plate and the latter will be held against the locating surfaces 24 in spite of any slight non-uniformity in the thickness of the different plates. The upper surfaces of the lower rails 31 underlie the plates 16 and are therefore protected, but any chips which may become lodged on these surfaces will be caught in the grooves 32 and discharged therefrom in the sliding movements of the plates.

To hold or clamp the carrier plates firmly against the locating surfaces 24 while the tools are acting on the work pieces, hydraulically actuated clamps are provided, one for each station opposite any tool unit. For this purpose, an hydraulic cylinder 45 is mounted on the base 30 with its axis disposed vertically and alined with the center of the carrier plate 16 as it comes to rest in the work station. A piston 46 in the cylinder has a rod 47 guided in a bushing 48 and carrying at its upper end a spider 49 having four arms 50 that project diagonally of the work plate. Threading through and locked to the end of each spider arm is an upwardly projecting pin 51 which is slidable in one of the bushings 40 in the raising and lowering movements of the spider. A vertical rod 53 (Fig. 6) fixed to one spider arm and guided in a vertical hole in the cross members of the castings 29 and 30 forms a part of the control mechanism not shown.

The spider is elevated by admitting pressure fluid to the cylinder 45 through a passage 52. After a rise predetermined by the adjustment of the pins relative to the spider arms, the upper ends of the pins engage the lower ends of the plungers 34, whereupon the clamping pressure applied to the piston 46 is distributed to the four plungers 34 and applied by the rails 31 to the carrier plate 16 thereby pressing this plate firmly against the locating surfaces 24. When the fluid pressure is relieved, the clamp is released and the spider is allowed to descend. If desired, this may be accelerated by admitting pressure fluid to the upper end of the cylinder through a passage 54.

Means is provided for limiting the upward movements of the rails 31 in the event that there is no plate 16 in the work station. Herein, this means comprises a pin 56 on the casting 29 projecting into a notch 57 in each plunger 34 and cooperating with a wall 58 of the notch to limit the upward movement of the plunger to a position slightly above normal.

Means operating automatically in the upward movement of the spider is provided for shifting the plate 16 laterally as may be required in order to locate it precisely relative to the lines of approach of the tools 11. This means comprises two dowel pins 59 (Fig. 6) having tapered upper ends and adapted to enter the holes 23 as shown in Fig. 6. These pins are replaceably threaded into and upstand from plungers 60 slidable vertically in bushings 61 which are carried by the casting 29. At their lower ends, the plungers are fastened to the spider arms 50. When the spider is in its lowermost position, the dowels are retracted below the plates 16. In this way, the dowel means moves with the clamp-applying member but operates to locate the work before the clamping pressure becomes effective.

Step-by-step transfer of the work pieces through the stations B to E may be effected by various kinds of shuttle devices. Herein, a bar 62 extending throughout the line of stations is mounted beneath the plates 16 and above the spiders 49 for endwise reciprocation. The bar is supported and guided by a plurality of flanged rollers 63 (Fig. 6) mounted on the casting 29. Its upper edge is engaged by an overlying lug 64 so as to hold rack teeth on the lower edge of the bar in mesh with a pinion 65 (Fig. 7). The latter is rotated through gearing 66 driven by a rack on a rod 67 of a piston 68 in a stationary cylinder 69. These parts are mounted in a box 68ᵃ which is disposed in and fastened to the base 30 at the last work station D.

Pawls 70 are pivoted on pins 71 spaced along the bar 62 distances slightly greater than the lengths of the work plates 16. Torsion springs 72 urge the pawls upwardly to positions determined by stop pins 73. In this position, the pawls will, when the piston 68 and the bar 62 are fully retracted, be disposed behind the rear edges 19 of the work plates 16 at all of the stations A to D. Now, when pressure fluid is admitted to the head end of the cylinder 69, the bar 62 will be moved to the right a distance equal to the spacing of the stations, the work piece at the last idle station A being advanced into the final work station E as shown in full outline in Fig. 8. The extent of the advance is determined by a stationary stop 75 (Fig. 7) adjustably mounted on the box 68ᵃ and positioned to engage a lug 76 on the pinion 65. As the bar advances, the work supporting plates 16 are slid along between the guide surfaces 24 and 25, and the plates at the work stations come to rest with the dowel holes 23 positioned to permit entry of the tapered ends of the dowel pins 59. Finally, the leading end of the actuator bar 67 may engage a stop 79 (Fig. 7) to relieve the gearing of the pressure which the hydraulic actuator continues to apply. Next, the spiders 49 are raised, as above described, first to dowel the work pieces and then to clamp the pieces in the final operating positions after which the tool heads 13 are advanced to machine the pieces. As usual, these heads operate in an automatic cycle and after their retraction out of engagement with the work pieces, the spiders may be lowered to release the clamps and withdraw the dowel pins thereby freeing the work pieces for advance to the next station.

To retract the transfer bar 62 preparatory to the next advance of the work piece, pressure fluid is admitted to the rod end of the cylinder 69. In the ensuing movement to the left as viewed in Fig. 7, the work plates engage inclined surfaces on the pawls 70 and depress the latter so that each pawl passes beneath the work piece next to be advanced thereby. When piston 68 reaches the head of the cylinder 69, each pawl end 74 will have passed the rear edge 19 of the plate and sprung up into active position behind the latter. To prevent possible sticking of the pawl in its depressed position, a cam lug 80 (Fig. 6) engages the pawl at 81 in the final part of the transfer bar retraction and moves the pawl upwardly with a positive action.

As above indicated, the fixed rails 27, providing downwardly facing positioning surfaces 24, are made sectional in character. This is for the purpose of permitting an emergency removal of the work. Thus it may happen that because of the breakage of a tool at one operating station, with a resulting failure to perform a preparing or conditioning operation before the tools at the next operative station become operative, the removal of the work piece before it enters the latter station may be necessary. In providing for such removal of the work in the event of an emergency, the fixed rails 27 are made sectional in character with the sections encompassed or included in each of the tool units of a length corresponding to the number of stations thus included, and with the sections between the units made of a length corresponding to the length of the space occupied by each idle station.

In Fig. 2 I have shown at the extreme left one of the stations C opposite tool unit 10ᶜ, next three idle stations A, then two stations D occupied by the next unit 10ᵈ, and finally an idle station A. In the case of the operating stations, the rails 27 are of a length corresponding to the space occupied thereby, as for example three stations C occupied by the unit 10ᶜ. However, in the case of idle stations A, each rail section is of a length corresponding to the space occupied by such idle station. In the present instance, the cap screws 28 are inserted through transverse slots 28ᵃ in the rail sections so that by loosening the screws the rail sections may be slid laterally clear of the carrier plates 16, thereby permitting easy removal of any work piece from the machine as may be desired.

The work pieces are moved into the loading station B along a guideway 82 (Figs. 1 and 8) which is perpendicular to the guideway defined by the surfaces 24, 25 and 26. This guideway comprises stationary rails 82ª alined with cross rails 31ª which are interrupted by openings 78 through which the rear end portion of the transfer bar 62 passes. The rails 31ª and the rails 31 at the station B are welded to a plate 77 (Figs. 8, 9 and 10) which is supported by the springs 38 in the same way as the rails 31 at the other stations. Instead of being actuated hydraulically, the spider 49 at this station is, for the sake of simplicity, actuated by cam means. In the present instance it is raised by the rearward movement of a bar 90 (Figs. 8 and 9) slidable on the base of the machine and yieldably connected at its rear end to a lever 91 pivoted at 92 and linked to the tool head. In the initial approaching movement of the latter, a cam 93 on the bar acts on a pin 94 on the lower end of the spider rod 47, causing the spider to enter the dowel pins 59 in the work plate 16 and then apply the clamping pressure to the plate 77 and the rails 31 and 31ª the same as the hydraulic actuators do at the work stations C and D. This occurs before engagement of the tools with the work. As the head is retracted and the tools withdrawn, the clamping pressure is released and the work piece freed. The plate 77 is provided with holes 77ª for the passage of the dowel pins 59.

To permit the work piece to be moved into the station B along the rails 82a and 31a, to be held therein while being operated upon, and then slid perpendicularly along the undersides of the rails 27, similar auxiliary fixed rails 95 and 96 (Fig. 10) are provided. The former terminates at the end of one rail 27 with its corner 97 overlying one corner of the work plate 16 in the station B. The rail 96 extends along and overlies one end margin 18 of the same work plate and this rail abuts the extended end of the other rail 27. The vertical surface 98 of the rail 96 guides the work piece laterally as it enters the station B and the extent of this motion is limited by engagement of the advancing margin 17 of the plate with the vertical surface 26 of the longer rail 27. Thus, in the station B, the work plate is clamped against the downwardly facing surfaces of the rails 27 and 96 and of the corner 97 of the rail 95. By locating the loading guideway 82 at right angles to the main guideway, one end of the work piece is left exposed at the loading station for machining by tools carried by the head 13ª. At the work stations C and D, it will be observed that the tools operate on opposite sides of the work pieces.

To expose the other end of the work piece for machining by tools on the head 13b, the main guideway terminates at the work station E (Fig. 1) and intersects an auxiliary guideway extending at right angles to the main guideway and including a plurality of stations F some of which may be work stations if desired. This guideway is formed by stationary rails 27ª and movable clamping rails 31b, the rails 27 and 27ª being disposed at right angles and abutting each other as shown in Fig. 7. The rails 27ª have vertical surfaces 26ª which guide the work plates laterally and downwardly facing surfaces 24ª against which the work plates are pressed upwardly by rails 31b (Fig. 8) which are mounted in the same manner as the rails 31 previously described.

As at the station B, the rails 31 at the station E and the cross-rails 31b are welded to a plate 77c and these rails have openings 100 therein through which the main transfer bar 62 and the auxiliary transfer bar 62ª move. The spider at this station is raised and lowered by a cam (not shown) of the same construction as that above described at the station B and actuated in the approaching movement of the tool head 13b to enter the dowels and clamp the work plate by pressing the plate 77c upwardly. The work plate is then located as shown in Fig. 7 against the surface 24 of the longer rail 27, the surface 24ª of the rail 27ª and the corner 99 at the end of the shorter rail 27.

The work pieces are advanced along the auxiliary guideway by the bar 62ª (Fig. 7) which carries pawls 70ª and is arranged to be operated from the rack bar 67. The connection is through bevel gears 83 within the gear box, a shaft 84, and a pinion 85 meshing with rack teeth on the bar 62ª. With this arrangement, the bar 62ª will make its active stroke, that is, move to the left as viewed in Fig. 7, while the bar 62 is being retracted. This results in movement of the last work piece in the main guideway out of the station E into the first station F along the auxiliary guideway. Then, as the main bar 62 is making its active stroke, the auxiliary bar 62ª is retracted to the position shown in Fig. 7. One pawl 70ª is beveled as indicated at 101 to prevent interference with the work piece which is advanced by the bar 62 into the station E as the bar 62ª is being retracted.

In operation, the various tool heads are advanced and retracted in timed relation to the step-by-step advance of the work pieces along the main and auxiliary guideways. Thus, each advance of the work indexing mechanism to bring new work pieces into the stations C and D is followed by doweling and clamping of these pieces and then the tool heads are advanced and retracted. The transfer bar 62 may be retracted while the tool heads are in motion. Upon full withdrawal of the tools and release of the clamping pressure and retraction of the dowels, the bar may be advanced to move the line of work pieces one step. The parts are then positioned to start the next cycle.

Loading of a work piece into the station A and movement of the auxiliary transfer bar 62ª must of course be timed properly relative to the main transfer motion. In this instance, the cycles of the tool heads 13ª and 13b are shorter than those of the heads 13 and may be initiated separately and later and yet will be completed substantially prior to completion of the main head cycles. Thus, the retraction of the head 13b may be utilized to initiate advance of the auxiliary bar 62ª and retraction of the main bar 62 so that the finished work piece at the station will be moved out of the way and the bar 62 will be conditioned for advance of the work pieces by the time that the work pieces at the main stations are released following retraction of the tool heads at the stations.

It will of course be understood that the various tool units and work indexing or transfer mechanism are in practice controlled for operation in a predetermined sequence by means of a suitable automatic control mechanism (not shown). This may be operatively associated with the transfer mechanism as by means of a pinion 86 meshing with rack teeth 87 on the actuator rod 67 (Fig. 7). Also suitable means is provided for interlocking the controls to insure execution of the different motions in the proper sequence, which means may be of the general character set forth in my copending application Ser. No. 413,633, filed October 4, 1941.

It will be observed from the foregoing that the work supporting and guiding structures above described are very simple in construction and yet provide for the accurate positioning of the work by effectually excluding dirt and chips from the work locating surfaces 24. The associated mechanisms for doweling the work pieces in place and for applying the clamping pressure are also simple in construction and reliable in operation and of such a nature that falling chips are prevented from influencing their operation. The chips formed by the tools fall through the openings 21 in the work plates 16, through the spaces between the adjacent work plates, or are pushed out of the grooves 32 in the clamping rails and thus fall down through openings in the castings 29 and 30. The openings 21 also permit of the passage of the tools in case the work is suspended from the plates 16 instead of being mounted above them.

I claim as my invention:

1. A machine tool having, in combination with a tool unit, work supporting and positioning means comprising laterally spaced members providing downwardly facing horizontal guide surfaces, work supporting and clamping rails extending along and disposed below said surfaces, a pair of plungers depending from each rail, tubular vertical guides receiving said plungers in their upper ends, springs enclosed by said guides and urging said plungers upwardly, a member disposed below said guides, pins upstanding from said member in alinement with said plungers and movable in the lower ends of said guides when the member is raised and lowered, and means for applying upwardly directed pressure to said member to raise said pins against said guides and cause a clamping pressure to be applied to said rails in opposition to pressure exerted on the work by said tool unit.

2. A machine tool having, in combination with a tool unit, work supporting and positioning means comprising laterally spaced members providing downwardly facing horizontal guide surfaces, rails extending along and disposed below said surfaces, plungers depending from said rails, said surfaces, plungers depending from said rails, vertical guides receiving said plungers in their upper ends, springs urging said plungers upwardly, pins slidable in the lower ends of said guides, and a power actuator for raising said pins against said plungers to apply a supplemental clamping pressure to said rails to hold the work against said guide surfaces during the operation of said tool unit.

3. A machine tool having, in combination, laterally spaced members providing downwardly facing horizontal guide surfaces, work supporting means cooperating with said surfaces to position work pieces for a machining operation comprising rails extending along and disposed below said surfaces, plungers depending from each rail, spring means urging said plungers upwardly, a member disposed below said guides, pins upstanding from said member in alinement with said plungers, and means for raising and lowering said member into and out of engagement with said plungers during said machining operation.

4. A machine tool for operating on work pieces having rigid therewith side flanges with upper and lower surfaces, said machine tool having, in combination, work supporting and positioning means comprising downwardly facing guides laterally spaced to engage the upper surfaces of said flanges, similarly spaced rails engageable with the undersides of said flanges and mounted for vertical movement, means yieldably urging said rails upwardly to overcome the weight of a work piece supported thereby and press said flanges against said guides while permitting the work piece to slide therealong, means for shifting the work piece along said guides and rails, and means for applying supplemental upwardly directed pressure to said rails to clamp said flanges between the rails and guides while the work piece is being machined.

5. A machine tool for operating on successive work pieces attached to plates, said machine tool comprising, in combination, a plurality of stations arranged in line and including work and idle stations, laterally spaced downwardly facing horizontal guides at each of said stations and engageable with the top surfaces of the work plates slid therealong, a pair of rails at each of said stations disposed below said guides and engageable with the undersides of said plates, spring means associated with each pair of rails and constantly urging the same upwardly to maintain the rails and guides in constant rubbing contact with said plates, means for advancing the plates along said guides, and means at each work station operable to supplement the force of said spring means and clamp said plates against said guides.

6. A machine tool for operating on work pieces having rigid therewith side flanges with upper and lower surfaces, said machine tool having, in combination, a line of stations, means providing downwardly facing guide surfaces laterally spaced to engage the upper surfaces of said flanges and extending through said stations, a pair of similarly spaced rails engageable with the undersides of the flanges of a work piece in each of said stations, said rails being mounted for vertical movement, means associated with each rail and yieldably urging the same upwardly to overcome the weight of the work piece supported thereby and press said flanges against said guide surfaces while permitting the work pieces to slide therealong, means for shifting the work pieces along said guide surfaces and rails with a step-by-step motion to present each piece to the successive stations, and means for applying supplemental upwardly directed pressures to the individual pairs of rails to clamp the work pieces between the rails and guide surfaces at each station.

7. A machine tool having, in combination, a plurality of machining stations arranged in a line, a stationary guide extending throughout said line of stations, means for supporting work pieces for movement into and out of machining positions at such stations including guide members at the respective stations movable toward and away from said guide and yieldably urged toward the latter, and individual power actuators for applying a supplemental force to said members to press the latter toward said guide during machining operations at said stations.

8. A machine tool having, in combination, a plurality of work stations arranged in a line, means providing stationary downwardly facing guide surfaces spaced laterally and extending through said line of stations, means for supporting work pieces for movement into and out of position relative to said work stations including guide members at the respective stations movable toward and away from said guide surfaces and yieldably urged toward the latter, and individual power actuators for applying a supplemental force to said members to press the latter toward said guide surfaces during machining operations at said stations.

9. A machine tool having, in combination, a machining station, a plurality of plates each adapted for the attachment of a work piece thereto, laterally spaced pairs of guides adapted to receive the margins of a row of said plates between them, one guide of each of said pairs being fixed and the other being bodily movable toward the fixed guide, means yieldably urging the movable guide toward the fixed guide to maintain continuous contact between said plates and guides, means for transferring a row of said plates along said guides, and power actuated means for applying pressure to said plates to clamp the latter against said fixed guide at said station.

10. A machine tool for operating on successive work pieces attached to plates each having dowel holes therein, said machine tool comprising, in combination, laterally spaced downwardly facing horizontal guides engageable with the top surfaces of a work plate slid therealong, rails disposed below said guides and engageable with the undersides of said plate, spring means constantly urging the same upwardly to maintain the rails and guides in constant rubbing contact with said plate, a member reciprocable vertically beneath said rails to apply thereto a force supplementing said spring means and clamping said plate against said guides while the work is being machined, and dowel pins carried by said member and adapted to enter said dowel holes during the initial upward movement of the member to apply said clamping pressure.

11. A machine tool having, in combination with a work supporting plate to which a work piece is secured so as to form oppositely projecting flanges, means providing stationary downwardly facing guide surfaces for sliding engagement by said flanges, means supporting said flanges to maintain the same in constant contact with said surfaces, a vertically movable member operable in its upward movement to apply a supplemental pressure to the work piece and clamp the latter against said surfaces while the work piece is being machined, the clamp pressure being relieved during lowering of the member, and means rendered active automatically in the upward movement of said member before clamping of the work piece and operable to engage the work piece and dowel the latter in place relative to said guide surfaces.

12. A machine tool having, in combination, means providing stationary downwardly facing guide surfaces for engagement by members rigid with the work pieces to be operated upon, spring pressed means normally engaging a work piece upwardly to maintain the same in constant contact with said surfaces, a member movable upwardly to apply a supplemental pressure to said work pieces and clamp the latter against said guide surfaces while the work pieces are being machined, and dowel means carried by said member and operable in the upward movement of the member to engage and locate the work piece laterally of said surfaces before the clamping pressure becomes effective.

13. A machine tool having, in combination with a plurality of tool units, an elongated guideway receiving a row of work pieces and supporting the latter for movement along the guideway relative to said units, a second guideway extending at right angles to said first guideway and adapted to receive a work piece moved laterally from said first guideway, a member reciprocable back and forth along said first guideway and operable on its active stroke to advance a row of work pieces and leave one piece disposed at the intersection of said guideways, a second member reciprocable back and forth along said second guideway and operable on its active stroke to transfer the terminal work piece out of said first guideway into the second guideway, and a common actuator for said members operable to advance one member while retracting the other member.

14. A machine tool having, in combination, a plurality of plates each adapted for the attachment of a work piece thereto, guideways adapted to receive the margins of a row of said plates between them, and each providing a fixed positioning surface, a plurality of tool units spaced along said guideways, means yieldably urging said plates toward said fixed surface, means for transferring a row of said plates step-by-step along said guideways, and power means for applying pressure to the plates at each of said tool units to clamp the latter against said fixed surface.

15. A machine tool comprising, in combination, a plurality of tool units arranged in spaced relation, laterally spaced rails having downwardly facing surfaces, a plurality of work carrying plates having marginal edge portions adapted to engage said downwardly facing rail surfaces, and means for supporting said plates for movement along said rails, said rails including sections arranged for movement out of retaining relation to said marginal edge portions of the plates to permit of the removal of said plates during their passage between said units.

16. A machine tool comprising, in combination, an elongated bed, a plurality of tool units spaced along said bed, a plurality of work supporting plates of uniform size, means on said bed slidably supporting said plates for movement from one of said stations to the other comprising laterally spaced rails providing downwardly facing surfaces for engagement by marginal edge portions of said plates, the distance between said units being a multiple of the dimension of the plates lengthwise of the bed and said rails comprising independently movable sections of a length corresponding to the length of said plates and secured to the bed for lateral shifting movement.

17. A machine tool having, in combination, a plurality of spaced tool units, means for supporting and guiding work pieces from one tool unit to another comprising a pair of laterally spaced guideways and work carriers having upper and lower guide faces for coaction with said guideways, means for advancing the carriers along said guideways, each of the guideways having vertically spaced guiding and positioning surfaces in continuous contact with the upper and lower guide faces of the carriers during the movement of the latter along the guideways, and power means operative intermittently to force said upper guide faces of the carriers into engagement with the downwardly facing guiding and positioning surfaces of the guideways while the work pieces are being machined by said tool units.

18. A machine tool having, in combination with a plurality of spaced tool units, means for supporting and guiding work pieces for presentation to said tool units successively, comprising a pair of laterally spaced guideways, a series of work carriers having marginal edge portions slidable in said guideways, each of the guideways having downwardly and inwardly facing guide surfaces and said marginal edge portions of the carriers having top and edge faces for coaction respectively with said downwardly and inwardly facing guide surfaces, means operative to maintain the top faces of said marginal edge portions in continuous engagement with said downwardly facing guide surfaces in the travel of the carriers along the guideways, and means operative at each of said tool units to force said upper guide faces on the carriers into engagement with the downwardly facing guide surfaces of the guideways.

19. A machine tool having, in combination, a plurality of working stations spaced apart and each having a tool unit, means providing stationary downwardly facing abutments at said stations for positioning work pieces for machining operations by said tool units, each of the work pieces having a part rigid therewith providing an upwardly facing locating surface for coaction with said abutments, means for advancing the work pieces from one work station to the next, members extending between said work stations and disposed in overlying relation to said locating surfaces so as to cover the same, and spring means acting to hold said locating surfaces and said members in continuous sliding engagement during the movement of the work pieces between stations.

20. A machine tool having, in combination, a plurality of working stations spaced apart and each having a tool unit, means providing stationary downwardly facing abutments at said stations for positioning work pieces for machining operations by said tool units, each of the work pieces having a part rigid therewith providing an upwardly facing locating surface for coaction with said abutments, means for advancing the work pieces from one work station to the next, and spring means urging said locating surfaces toward said abutments so as to maintain such surfaces in sliding engagement with the abutments during the movement of the work pieces into said stations.

21. A machine tool having, in combination, a plurality of working stations spaced apart and each having a tool unit, means providing stationary downwardly facing abutments at said stations for positioning work pieces for machining operations by said tool units, each of the work pieces having a part rigid therewith providing an upwardly facing locating surface for coaction with said abutments, means for advancing the work pieces from one work station to the next, guide members extending between said work stations and disposed in overlying relation to said locating surfaces so as to cover the same, and means yieldably holding said locating surfaces in sliding contact with said guide members and said abutments successively during the advance of the work pieces from station to station.

22. A machine tool having, in combination with a tool unit, laterally spaced members providing downwardly facing horizontal guide surfaces, work supporting means cooperating with said guide surfaces to position work for machining operations by said tool unit, said supporting means comprising clamping members disposed below said surfaces, spring pressed plungers yieldably supporting said members, and power actuated means operative to apply an upward clamping pressure to said rails through said plungers.

23. A machine tool having, in combination, a plurality of working stations spaced apart and each having a tool unit, means providing downwardly facing abutments at said stations for positioning workpieces to be operated on by said tool units, each of said workpieces having a plate rigid therewith providing upwardly facing locating surfaces along opposite marginal edge portions for coaction with said abutments in positioning the workpieces, guideways extending between said stations each comprising stationary members providing downwardly facing guide surfaces, and movable members providing opposed upwardly facing guide surfaces, said members being spaced apart to receive the marginal edge portions of said plates, means for moving said plates from one station to another along said guideways, and means yieldably urging said movable members toward said stationary members to maintain the locating surfaces of said plates in continuous engagement with the guide surfaces of said stationary members during the movement of said plates whereby to prevent the deposit of chips or other foreign material on said locating surfaces.

24. A machine tool for operating upon workpieces having rigid side portions providing opposite locating surfaces, said machine tool having a plurality of tooling stations, means for guiding and supporting the workpieces for movement from one tooling station to another comprising stationary guide members providing positioning surfaces for coaction with one of the locating surfaces of each of the workpieces, elongated movable guide members supported in opposed relation to the stationary guide members and having rigid therewith plungers projecting perpendicular thereto, means supporting said plungers for guiding the movable members toward and from the stationary guide members, spring means acting on said plungers to urge the movable guide members toward the stationary guide members, and adjustable stop means coacting with said plungers to limit the movement thereof relative to their supporting means.

25. An extended guide construction for guiding workpieces along a path from one work location to another, wherein said workpieces are provided with laterally projecting portions presenting upper and lower guide surfaces at each side thereof, said guide construction including a pair of laterally spaced guideways for receiving the workpieces therebetween and for guiding said laterally projecting portions as the workpieces advance from work location to work location, each of said guideways comprising parallel fixed and movable guide members extending along the path of movement of the workpieces and spaced apart vertically for receiving said projecting portions therebetween, yieldable means acting upon the movable guide members to urge them toward the fixed guide members to maintain continuous rubbing contact between the guide members and said laterally projecting portions of the workpieces, and means at each work location for forcibly urging said projecting portions while in contact between said guide members vertically against said fixed guide members to fixedly clamp said projecting portions thereto and thereby fixedly locate the related workpiece at the work location.

JUDSON H. MANSFIELD.